(12) United States Patent
Murthy et al.

(10) Patent No.: US 6,694,479 B1
(45) Date of Patent: *Feb. 17, 2004

(54) MULTIPLE DRIVE FAILURE RECOVERY FOR A COMPUTER SYSTEM HAVING AN ARRAY OF STORAGE DRIVES

(75) Inventors: Purna C. Murthy, Houston, TX (US); Sohail Hameed, Houston, TX (US); Mark J. Thompson, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/576,665

(22) Filed: May 23, 2000

(51) Int. Cl.$^7$ ................................................ G11C 29/00
(52) U.S. Cl. ........................................ 714/805; 714/758
(58) Field of Search .................................... 714/718, 800, 714/758, 801, 803, 804, 805, 755; 711/114; 710/103; 707/202; 365/201; 326/54

(56) References Cited

U.S. PATENT DOCUMENTS

| | | | | |
|---|---|---|---|---|
| 5,742,792 A | * | 4/1998 | Yanai et al. | 711/162 |
| 5,959,914 A | * | 9/1999 | Gates et al. | 365/201 |
| 6,092,215 A | * | 7/2000 | Hodges et al. | 714/6 |
| 6,098,114 A | * | 8/2000 | McDonald et al. | 710/5 |
| 6,128,686 A | * | 10/2000 | Sabotta et al. | 710/314 |
| 6,138,125 A | * | 10/2000 | DeMoss | 707/202 |
| 6,370,616 B1 | * | 4/2002 | Callison et al. | 711/114 |
| 6,487,633 B1 | * | 11/2002 | Horst et al. | 711/112 |
| 6,516,425 B1 | * | 2/2003 | Belhadj et al. | 714/6 |

OTHER PUBLICATIONS

G.A. Alvarez et al.; *Tolerating Multiple Failures in RAID Architectures with Optimal Storage and Uniform Declustering*; Dept. of Computer Science and Engineering, University of California, San Diego.

M.O. Rabin; *Efficient Dispersal of Information for Security, Load Balancing and Fault Tolerance*; Apr. 1989; pp. 335–348; Journal of the Association for Computing Machinery, vol. 36, No. 2.

A. Bestavros; *SETH A VLSI Chip for the Real–Time Information Dispersal and Retrieval for Security and Fault–Tolerance*; 1990; pp. I–457–I–464; 1990 International Conference on Parallel Processing.

* cited by examiner

*Primary Examiner*—Emmanuel L. Moise
*Assistant Examiner*—Mujtaba Chaudry (57) ABSTRACT

A method and related system for generating error correction or parity information in a multiple disk computer system supporting multiple drive fault tolerance. The method involves defining parity equations to be based not only on data written to drives of the computer system but also on other parity information such that in solving for missing data, specific equations need not be used. Defining parity equations in this manner, in combination with a coefficient matrix that defines the coefficients of the various parity equations, ensures the ability to solve for the missing data even if some of the failed drives contain parity information.

23 Claims, 6 Drawing Sheets

$$\begin{bmatrix} 1 & 1 & 1 & 1 & \cdots & 1 \\ 1 & 2 & 3 & 4 & \cdots & N \\ 1^2 & 2^2 & 3^2 & 4^2 & \cdots & N^2 \\ 1^3 & 2^3 & 3^3 & 4^3 & \cdots & N^3 \\ \vdots & \vdots & \vdots & \vdots & \vdots & \vdots \\ 1^{p-1} & 2^{p-1} & 3^{p-1} & 4^{p-1} & \cdots & N^{p-1} \end{bmatrix}$$

FIG. 1A
PRIOR ART $$\begin{bmatrix} 1 & 0 & 0 \\ 0 & 1 & 0 \\ 0 & 0 & 1 \end{bmatrix} \begin{bmatrix} d_0 \\ d_1 \\ d_2 \end{bmatrix} = \begin{bmatrix} d_0 \\ d_1 \\ d_2 \end{bmatrix}$$

FIG. 1B
PRIOR ART

FIG. 2A
PRIOR ART $$\begin{bmatrix} 1 & 0 & 0 \\ 0 & 1 & 0 \\ 0 & 1 & 0 \\ 1 & 1 & 1 \end{bmatrix} \begin{bmatrix} d_0 \\ d_1 \\ d_2 \end{bmatrix} = \begin{bmatrix} d_0 \\ d_1 \\ d_2 \\ P \end{bmatrix}$$

WHERE
$P = d_0 \oplus d_1 \oplus d_2$

FIG. 3B PRIOR ART $$\begin{bmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 1 & 1 & 1 & 1 & 1 \\ 1 & \alpha & \beta & \gamma & \delta & \epsilon \end{bmatrix} \begin{bmatrix} d_0 \\ d_1 \\ d_2 \\ d_3 \\ d_4 \\ d_5 \end{bmatrix} = \begin{bmatrix} d_0 \\ d_1 \\ d_2 \\ d_3 \\ d_4 \\ d_5 \\ P_0 \\ P_1 \end{bmatrix}$$

WHERE
$P_0 = d_0 \oplus d_1 \oplus d_2 \oplus d_3 \oplus d_4 \oplus d_5$
$P_1 = d_0 \oplus \alpha d_1 \oplus \beta d_2 \oplus \gamma d_3 \oplus \delta d_4 \oplus \epsilon d_5$ $$\begin{bmatrix} 1 & 1 \\ \beta & \gamma \end{bmatrix} \begin{bmatrix} d_2 \\ d_3 \end{bmatrix} = \begin{bmatrix} P'_0 \\ P'_1 \end{bmatrix}$$

FIG.4A

PRIOR ART $$\begin{bmatrix} d_2 \\ d_3 \end{bmatrix} = \begin{bmatrix} 1 & 1 \\ \beta & \gamma \end{bmatrix}^{-1} \begin{bmatrix} P'_0 \\ P'_1 \end{bmatrix}$$

FIG.4B

PRIOR ART $$\begin{bmatrix} 1 & 1 & 1 & 1 & \cdots & 1 \\ 1 & 2 & 3 & 4 & \cdots & N \\ 1^2 & 2^2 & 3^2 & 4^2 & \cdots & N^2 \\ 1^3 & 2^3 & 3^3 & 4^3 & \cdots & N^3 \\ \vdots & \vdots & \vdots & \vdots & \vdots & \vdots \\ 1^{p-1} & 2^{p-1} & 3^{p-1} & 4^{p-1} & \cdots & N^{p-1} \end{bmatrix}$$

FIG.5

$$\begin{bmatrix} 0 & 0 & 0 & 0 & 0 & 0 & 0 & 0 & 0 & 0 & 0 & 0 & 0 & 0 & 0 \end{bmatrix}$$

$$=$$

$$\begin{bmatrix} d_1 & d_2 & d_3 & d_4 & d_5 & d_6 & d_7 & d_8 & d_9 & d_{10} & d_{11} & d_{12} & \pi_1 & \pi_2 & \pi_3 \end{bmatrix}$$

$$\begin{bmatrix} 1 & 1 & 1 & 1 & 1 & 1 & 1 & 1 & 1 & 1 & 1 & 1 & 1 & 1 & 1 \\ 1 & 2 & 3 & 4 & 5 & 6 & 7 & 8 & 9 & 10 & 11 & 12 & 13 & 14 & 15 \\ 1 & 2^2 & 3^2 & 4^2 & 5^2 & 6^2 & 7^2 & 8^2 & 9^2 & 10^2 & 11^2 & 12^2 & 13^2 & 14^2 & 15^2 \end{bmatrix}$$

MULTIPLE DRIVE FAILURE RECOVERY FOR A COMPUTER SYSTEM HAVING AN ARRAY OF STORAGE DRIVES

CROSS-REFERENCE TO RELATED APPLICATIONS

This application is related to application Ser. No. 09/576,666 entitled "Computer System With Greater Than Fifteen Drive Fault Tolerance," and application Ser. No. 09/576,749 entitled "Encryption Keys For Multiple Drive Fault Tolerance."

STATEMENT REGARDING FEDERALLY SPONSORED RESEARCH OR DEVELOPMENT

Not applicable.

BACKGROUND OF THE INVENTION

1. Field of the Invention

The present invention relates generally to computer systems having multiple storage drives. More specifically, the invention relates to recovering from multiple drive failures in a computer system having an array of storage drives. More specifically still, the invention relates to a failure recovery scheme where it is assured missing data can be recovered regardless of which particular drives fail.

2. Background of the Invention

Early computer systems typically had only one hard drive or fixed storage device. Even today, computer systems having a single fixed storage drive are standard for personal computer systems. However, commercial and industrial computer users require greater data stability. That is, commercial and industrial computer users want some assurance that information stored on hard disks will not be lost in spite of drive failures.

Some users ensure data stability by performing periodic backups onto tape drive systems. For example, a user may make a complete backup of their hard drive contents on a weekly basis. The user may further make copies of only the changes since the last backup, commonly known as an incremental backup, on a daily basis. However, even this method leaves open the possibility that some information may be lost if there is a failure of the hard drive between data backups. Data stability demands drove computer manufacturers to make computer systems having multiple fixed storage devices.

Figure 1A:
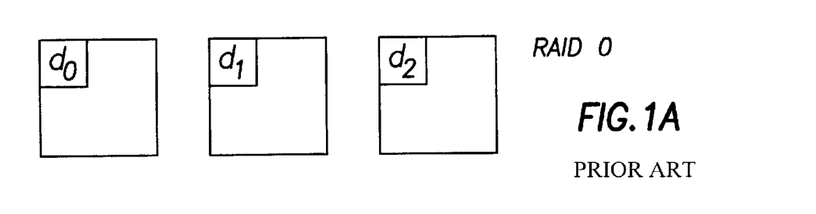
FIG. 1A shows a three-drive RAID0 system.
Figure 1B:
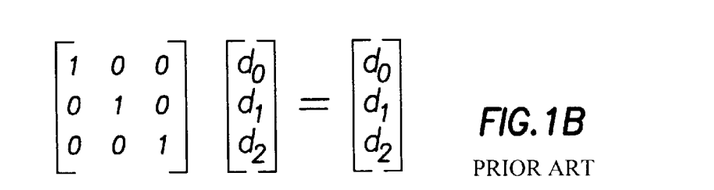
FIG. 1B shows a mathematical relationship in matrix format for the RAID0 system.

FIG. 1A represents one approach computer manufacturers take in storing data in a computer system having multiple hard drives. In FIG. 1A, each of the large boxes represents a hard drive in a computer system. One block of data D, being the set of data $[d_0, d_1, d_2]$, is divided into small subsets and distributed across the hard drives of the computer system. Thus, the information is stored on an array of disks. This configuration is commonly known as a Redundant Array of Inexpensive Disks ("RAID"), and may also be known as a Redundant Array of Independent Disks. The system exemplified in FIG. 1A is commonly known as RAID0. The disadvantage of the RAID0 system is that upon failure of any one of the disk drives, the overall data D cannot be recovered. FIG. 1B represents, in matrix format, the storage system of RAID0. Carrying out the matrix multiplication of FIG. 1B reveals that $d_0=d_0$, $d_1=d_1$ and $d_2=d_2$, which is mathematically uneventful, but is important in other systems as described below. As compared to a single hard drive computer system, RAID0 actually increases the probability of data loss in that a failure of any one of the drives results in a complete data loss. RAID0 exemplifies an important concept in multiple disk arrays, that concept being "striping". With reference to FIG. 1A, data D is the combination of the smaller portions of data being $[d_0, d_1, d_2]$. Placing small portions on each drive of a multiple drive system is known as striping. That is, data is striped across multiple drives.

Manufacturers may address the problem associated with a striped RAID0 system by "mirroring". In a mirrored system, there are duplicate drives containing complete sets of duplicate information. For example, an array of drives may consist of four drives, data D may be striped across two drives, and likewise striped again across the other two drives. In this way, as many as two drives may fail without loss of data, so long as the drive failures are not the drives containing the duplicate information. Fault tolerance implemented in this configuration is known as "RAID1+0", "RAID0+1" or "RAID10." While a RAID1+0 ensures greater data stability over a RAID0 or a single disk system, the overhead associated with implementing such a system is high. In the exemplary system described, the effective storage utilization capacity of the four disk drives is only 50%. What was needed in the industry was a fault tolerance scheme that had a higher storage utilization capacity, which would therefore make it less expensive to implement.

Figure 2A:
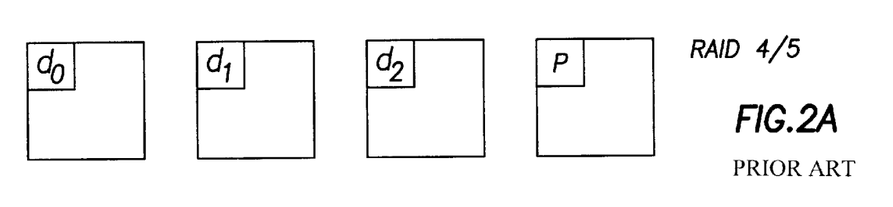
FIG. 2A shows an exemplary RAID4/5 system.

FIG. 2A represents a series of hard drives in a computer system that has the same number of hard drives as described with respect to mirroring, however, this specific system reaches a 75% utilization capacity. In this system the data represented by $D[d_0, d_1, d_2]$ is striped across the first three of the four disk drives. The system of FIG. 2A further writes error correction or parity information to the fourth disk drive. Such a system is referred to as having three data drives and one parity drive. It is noted that having three data drives is merely an exemplary number and more or fewer data drives are possible. However, fewer data drives translates into lower storage utilization. Likewise, a greater number of data drives represents higher storage utilization. Indeed, as the number of data drives significantly increases, with one parity drive, it is possible that the storage utilization may approach, but never actually reach, 100%.

Figure 2B:
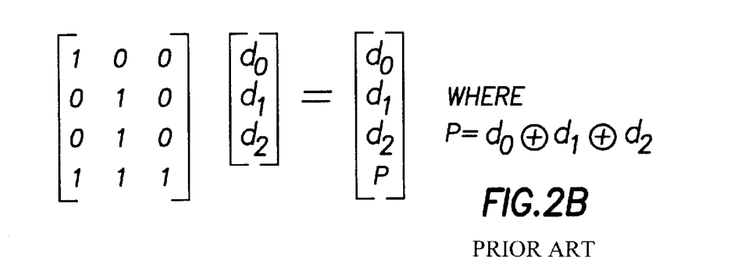
FIG. 2B shows the mathematical relationship of the data and parity information, in matrix format, for the RAID4/5 system.

The subset of data written to the parity drive of FIG. 2A is related to the data written to each of the data drives. FIG. 2B shows the relationship, in matrix format, of each data subset written to the data drives and the value of the parity subset written to the parity drive. Carrying out the matrix multiplication of FIG. 2B reveals that $d_0=d_0$, $d_1=d_1$, $d_2=d2$ and $P=d_0{\char94}d_1{\char94}d_2$, where "^" represents the logical exclusive-OR (XOR) function. Thus, as is indicated in the figure and shown above, the value of the parity subset is the XOR of each of the smaller subsets of the overall data. A system implementing the configuration of FIGS. 2A, 2B is capable of recovery from a single drive failure. Loss of the parity drive does not affect stability of the data. However, loss of any one of the data drives is a recoverable error inasmuch as the data lost on the failed drive may be calculated using the remaining subsets of information in combination with the parity information. Such a fault tolerance scheme is known as RAID4.

In a RAID4 system any write operation to any of the data drives also requires a write to the parity drive. This is true even if only one of the data drives is written. In the three data drive system exemplified in FIG. 2A, data throughput is not significantly hampered by this requirement. However, as the number of data drives increases system performance suffers as write commands to the parity drive accumulate.

In computer systems requiring more than a handful of data drives, the RAID4 system is less desirable because of the throughput capabilities associated with queuing of write requests at the parity drive. Manufacturers address this problem by rotating the parity drive. That is, rather than having designated data and parity drives, the particular hard drive containing the parity information shifts for each block of parity data. Such a distributed parity system is known as RAID5. Although parity information is written for each write of a subset of data, no one hard drive becomes the receptacle for all those parity writes. In this way, system throughput is not limited by one parity drive having numerous writes stacked in its input queue.

The disk arrays discussed to this point may each have desirability in particular systems. That is to say, a RAID5 system may be overkill for an application where there is a somewhat limited amount of data to be stored. It may be more economical in this circumstance to implement a RAID1 system. Likewise, where large amounts of data must be stored, a RAID5 may be more desirable.

Except for the two-drive mirroring technique discussed with respect to RAID1, the systems discussed to this point have only had the capability of recovering from a single drive failure in the array. For systems having a relatively small number of hard drives, the ability to recover from a single drive failure may be sufficient. However, as the number of drives increase in a disk array system, the capability to recover from a single drive failure may not sufficiently protect data integrity. For example, if a computer system has an array of 10 disks, the probability of having a second drive fail before a user fixes a first drive failure is significantly greater than for a three disk system. Thus, for computer system users requiring large arrays of hard disk drives, the capability to recover from multiple drive failures is desirable.

Figure 3A:
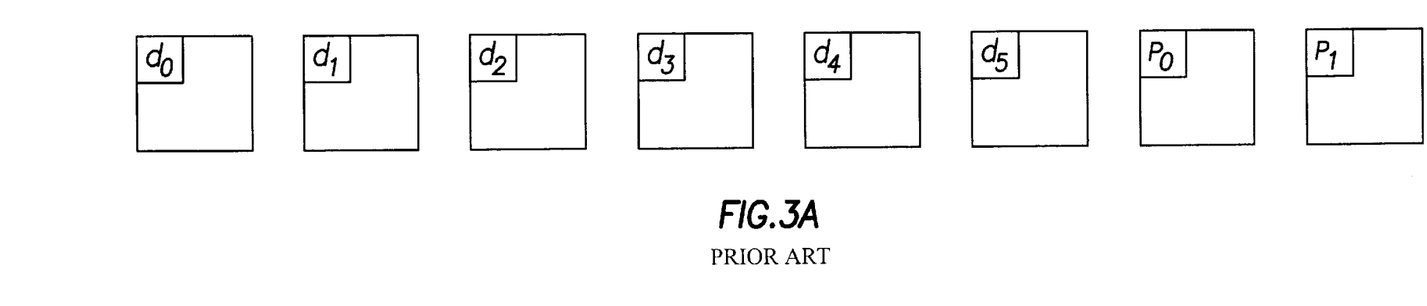
FIG. 3A exemplifies a two-drive fault tolerant scheme.
Figure 3B:
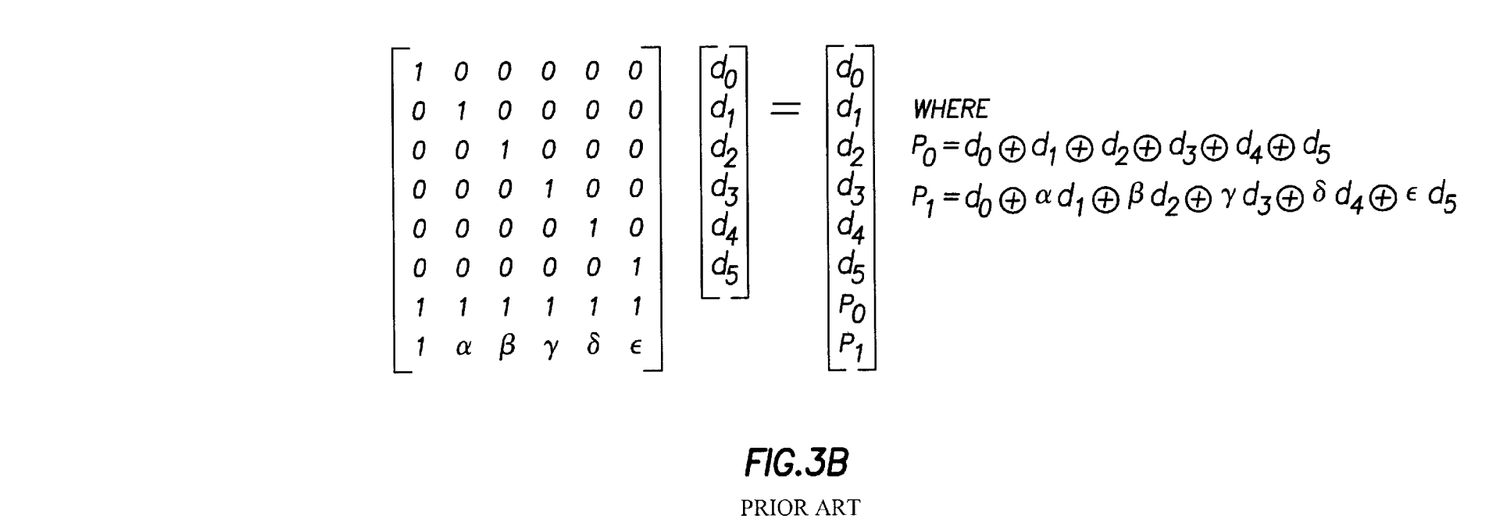
FIG. 3B shows the mathematical relationship of the data and parity information, in matrix format, for the system exemplified in FIG. 3A.

FIG. 3A exemplifies a computer system having six data drives and two parity drives. By having two parity drives the overall disk array has the ability to recover from the failure of up to two data drives. For ease of description, the hard drives exemplified in FIG. 3A are drawn in the RAID4 format. That is, the figure shows six distinct data drives and two distinct parity drives. However, it will be understood that while this system may be operational in this configuration, most manufacturers distribute the parity function across all the drives as discussed with respect to the RAID5 format. Also, only six data drives are shown. Prior art RAID systems support up to fifteen data drives in addition to the parity drives. FIG. 3B shows, in matrix form, the relationship between the subsets of data $[d_0 \ldots d_5]$ to the values of the two parity blocks. The equation representing the values of parity block zero, $P_0$, is merely an extension of the parity block as calculated and described with respect to the RAID4/5 system. However, the description of the equation for calculating the second parity block, $P_1$, requires further description that must begin with a brief digression into linear algebra.

As is well known in mathematics, in systems of linear equations it is possible to solve for X number of unknown variables so long as there are X number of linearly independent equations. Linear independence means that each equation describes different information. Applying this concept to the array of hard disks exemplified in FIG. 3A, each parity block or value needs to contain information that is not related to the other blocks such that given two hard drive failures, for this system, there are two linearly independent equations from which data for the two failed drives may be calculated. Stated otherwise, and referring to FIG. 3B, the coefficients for the second parity equation, $P_1$, being represented in the figure as $\alpha, \beta, \gamma, \delta$, and $\epsilon$, are chosen such that the equations defining each of the parity blocks are linearly independent. The problem may be somewhat exemplified by assuming for sake of argument that $\alpha, \beta, \gamma, \delta$, and $\epsilon$, are assigned a value of 1. Thus, the parity equations of the exemplary system using the assumption are:

$$P_0 = d_0 \char`\^ d_1 \char`\^ d_2 \char`\^ d_3 \char`\^ d_4 \char`\^ d_5$$

$$P_1 = d_0 \char`\^ d_1 \char`\^ d_2 \char`\^ d_3 \char`\^ d_4 \char`\^ d_5$$

As is seen, the equation representing the parity value $P_0$ exactly matches the equation representing the parity value $P_1$. Therefore, using this assumption only one equation exists and the missing data cannot be calculated.

Figure 4A:
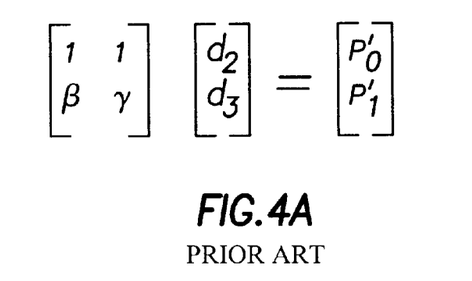
FIG. 4A shows a matrix solution for determining missing data given two drive failures of the system of FIG. 3A.
Figure 4B:
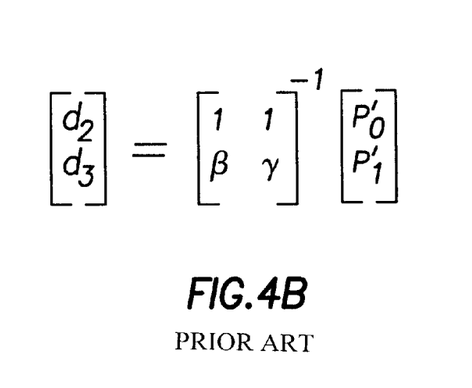
FIG. 4B shows a reduced matrix solution for finding missing data for two failed drives for the system of FIG. 3A.

Assume for purposes of explanation that the system of FIGS. 3A, 3B has failures of two drives, the drives that hold data subsets $d_2$ and $d_3$. FIG. 4A represents the matrix solution for determining missing data from drives $d_2$ and $d_3$ given the configuration of FIG. 3A. $P_0'$ and $P_1'$ are the equations for the parity information $P_0$ and $P_1$ solved for the missing components $d_2$ and $d_3$ respectively. Solving for the unknown data $d_2$ and $d_3$ involves taking the inverse of the 2×2 matrix and multiplying it by $P_0'$ and $P_1'$ as shown in FIG. 4B. However, not all matrices are invertable. A matrix may be inverted only if the coefficients of each row are linearly independent from the coefficients of all the other rows. Thus, stating that the 2×2 matrix given in FIG. 4A is invertable is equivalent to saying that the equations that the 2×2 matrix represents are linearly independent as discussed above. Therefore, selecting the variables $\alpha, \beta, \gamma, \epsilon$, and $\epsilon$, etc. is critical to ensuring linear independence.

Thus, it would be desirable to ensure that, regardless of the number or order of failed drives the equations used to solve for the missing data are linearly independent. Despite the desirability of computer systems with such an assurance, none have been developed.

BRIEF SUMMARY OF THE INVENTION

The problems noted above are solved in large part by a method of generating error correction or parity values. The method involves calculating each particular parity value with the information from all the other parity values such that in the event of a drive failure, no particular equation from the array of equations need be selected. In this way, given N number of drive failures, the drive array controller hardware need only select the first N number of equations defining parity values. The linear independence of the equations used to solve for missing data is guaranteed regardless of which data drives from the array of drives fail.

A second related aspect of the preferred embodiment of this invention is a coefficient matrix, which, if used in calculating error correction or parity values, and in combination with incorporating parity information from all other parity blocks into each parity calculation, ensures the invertability or linear independence of the simultaneous equations that must be solved for missing data.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. Also, the terms "parity value" and "parity equation" should not be confused. Strictly speaking, an error correction or parity value of the preferred embodiment is a value calculated based at least on data values. The parity value calculation performed using a parity equation. Thus, solving a parity equation for missing data means reading a stored parity value, as well as non-missing data, and calculating, using the parity equation, the missing value or values.

DETAILED DESCRIPTION OF THE PREFERRED EMBODIMENTS

The prior art defines parity equations to generate parity values as a function of the data subsets only. If a computer system user experiences a plurality of drive failures, where some of those drive failures include the failure of drives containing parity information, hardware responsible for calculating missing data may be required to select only the remaining parity information, and therefore their defining equations, which may not be linearly independent. Take for example a computer system having ten data drives with four drive fault tolerance. In such an exemplary system there are 14 hard drives altogether. If we suppose the fault of four drives, two data drives and two parity drives, it is easily understood by one of ordinary skill in the art that the parity value on the remaining two parity drives, and therefore their parity equations, must be selected to solve for the missing data. If the selected parity equations skip rows, e.g. having to select the first and fourth parity equation, the possibility exists that these two equations are not linearly independent because of the coefficients defining them.

The preferred embodiment of this invention addresses these problems by a combination of a predetermined coefficient matrix and a unique method of calculating parity information. Parity equations of the preferred embodiment are not based only on the subsets of data written to the data drives, but also incorporate the parity information generated by all the other parity equations. In this way, regardless of which drives in the computer system fail, even drives containing parity information, solving for missing data involves successively selecting parity equations starting with the first parity equation and extending into the parity equations by the number of failed data drives. Thus, when solving for missing data one is not relegated to using particular parity equations. Incorporating parity information from all the other parity drives into each parity calculation however does not relieve the user of selecting coefficients for these parity equations that define linearly independent solutions.

Figure 5:
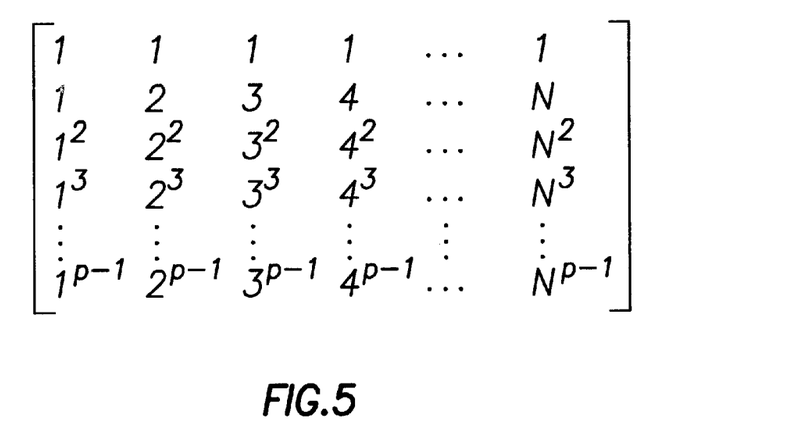
FIG. 5 shows the coefficient matrix of the preferred embodiment.

FIG. 5 shows the preferred coefficients for parity equations of the preferred embodiment. In FIG. 5, N represents the overall number of drives (data plus parity) and p is the number of parity drives. The coefficient matrix of FIG. 5 defines coefficients for parity equations that have the characteristic that if one takes the first n rows (that is, the first n parity equations) in an attempt to solve for n drive failures, the first n rows are guaranteed to define linearly independent equations. Thus, in the preferred embodiment the coefficients of the coefficient matrix of FIG. 5 become the coefficients of the parity equations to define linearly independent equations.

Figure 6:
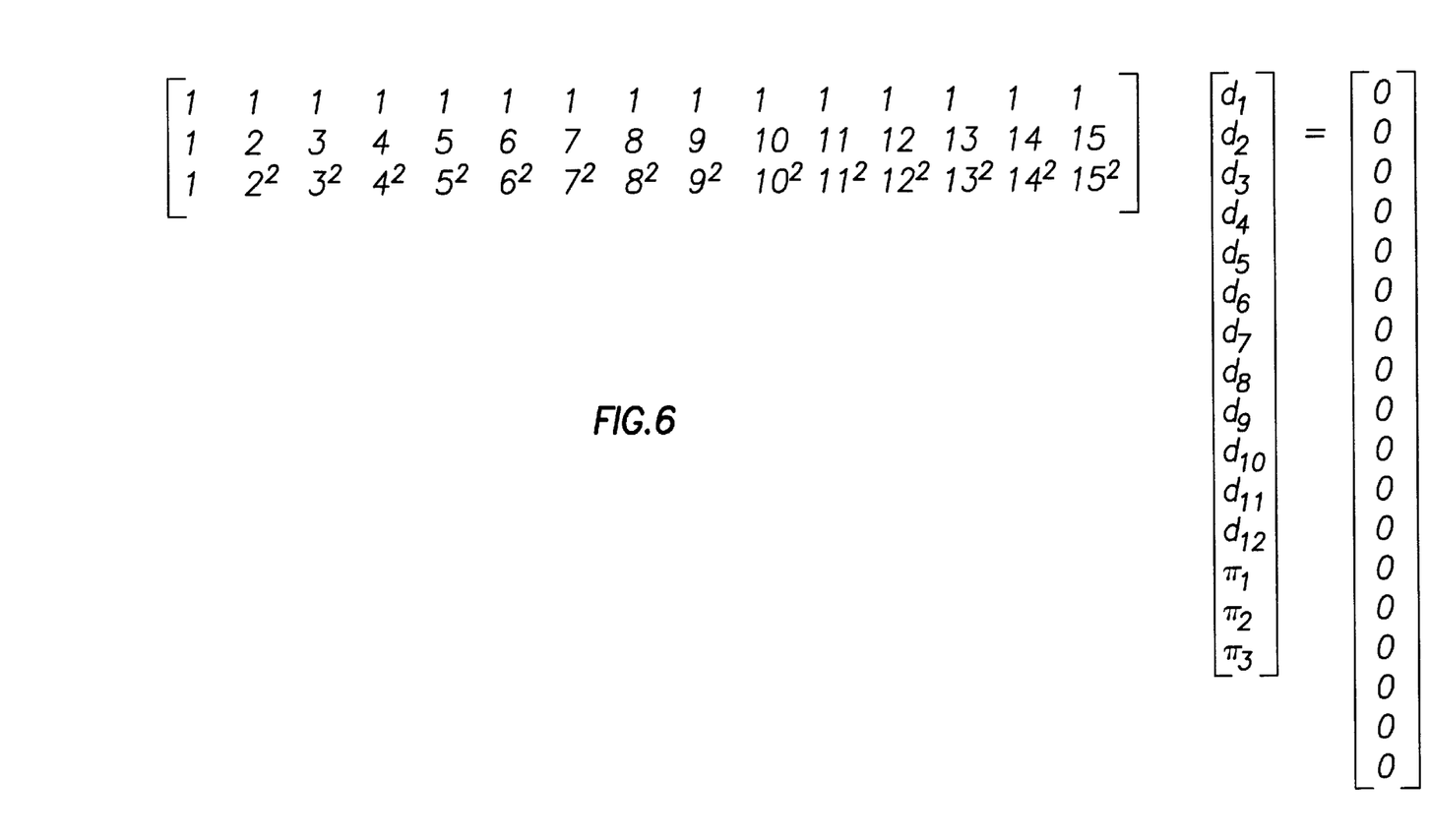
FIG. 6 shows the mathematical relationship, in matrix format, of the parity equations of the preferred embodiment in an exemplary system having 12 data drives and three parity drives.

Suppose for purposes of explanation that a computer or server system has 15 total drives (N=15) where three of those drives are parity drives (p=3). It is noted that while the description of the exemplary system is in the RAID4 format (that is, designated parity and data drives), preferably data and parity values are distributed over all the drives as explained in the background section. FIG. 6 shows, in matrix format, the mathematical relationship between the coefficient matrix of FIG. 5, having N=15 and p=3 for the exemplary 15 drive system with three drive fault tolerance. The parameters $\pi_1$, $\pi_2$, and $\pi_3$ represent the parity drives. Carrying out the multiplication reveals three parity constraint equations (equations algebraically manipulated to be equal to zero) for this exemplary system:

$$d_1 \hat{} d_2 \hat{} d_3 \hat{}$$

$$d_4 \hat{} d_5 \hat{} d_6 \hat{}$$

$$d_7 \hat{} d_8 \hat{} d_9 \hat{}$$

$$d_{10} \hat{} d_{11} \hat{} d_{12} \hat{}$$

$$\pi_1 \pi_2 \hat{} \pi_3 = 0 \qquad (1)$$

$$d_1 \hat{} 2 d_2 \hat{}$$

$$3 d_3 \hat{}$$

$$4 d_4 \hat{} 5 d_5 \hat{}$$

$$6 d_6 \hat{} 7 d_7 \hat{}$$

$$8 d_8 \hat{} 9 d_9 \hat{}$$

$$10 d_{10} \hat{} d_{10} \hat{} 11 d_{11} \hat{}$$

$$12 d_{12} \hat{} 13 \pi_1 \hat{}$$

$$14 \pi_2 \hat{} 15 \pi_3 = 0 \qquad (2)$$

$$d_1 \hat{} 2^2 d_2 \hat{}$$

$$3^2 d_3 \hat{} 4^2 d_4 \hat{}$$

$$5^2 d_5 \hat{\ } 6^2 d_6 \hat{\ }$$

$$7^2 d_7 \hat{\ } 8^2 d_8 \hat{\ }$$

$$9^2 d_9 \hat{\ } 10^2 d_{10} \hat{\ }$$

$$11^2 d_{11} \hat{\ } 12^2 d_{12} \hat{\ }$$

$$13^2 \pi_1 \hat{\ } 14^2 \pi_2 \hat{\ }$$

$$15^2 \pi_3 = 0 \quad (3)$$

where "^" is the exclusive-OR (XOR) function. Thus, each parity equation used to calculate parity values is based on each data subset (in this exemplary case the data subsets[$d_1$ $d_2$ ... $d_{11}$ $d_{12}$]), as well as the remaining parity values. Calculating coefficients defined in FIG. 5, and also multiplying those coefficients with data subsets within the realm of finite field arithmetic are addressed in co-pending application Ser. No. 09/576,666, entitled "Computer System With Greater Than Fifteen Drive Fault Tolerance." That disclosure is incorporated by reference into this document as if reproduced in full below. For purposes of this disclosure, finite field arithmetic means mathematical operations in a constant field width, e.g., 8 bits.

Now suppose three drive failures in the exemplary 15 drive system, two data drives and one drive containing the $\rho_2$ information. In the prior art, the user was required to use the $\rho_1$ and $\rho_3$ values(and therefore their equations) to back calculate the missing data. In the preferred embodiment of this invention, given n drive failures, preferably the first n parity equations are chosen to calculate the missing data. Thus, computer system hardware preferably chooses equations (1) and (2) above to solve for the missing data. Hardware chooses these equations in spite of the fact that the drive containing the particular parity information, in this example $\rho_2$, may be one of the failed drives. This selection is viable however because each of the parity equations incorporates all the other parity values. Defining parity information in this manner, in combination with the coefficient matrix of FIG. 5, ensures linear independence of the equations used to calculate missing data. Stated otherwise, in a multi-drive system where there are N number of drives in the system and there are p number of parity drives (drive fault tolerance ability), defining the relationship of the parity equations using coefficients from the coefficient matrix of FIG. 5 and selecting equations starting with the upper most row, i.e. equation (1) above, and working down into the matrix by the number of failed drives ensures a system of equations that are linearly independent.

Figure 7:
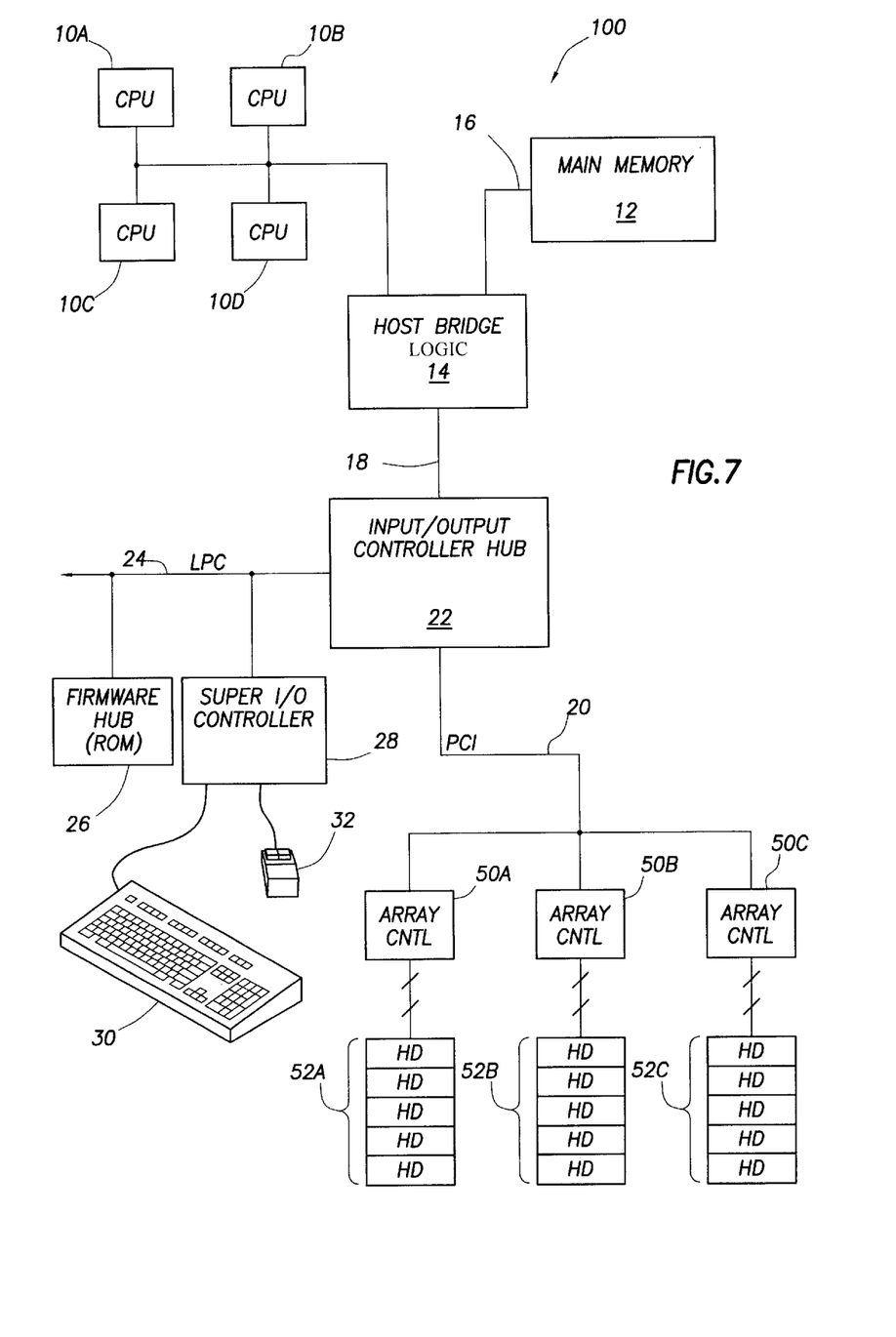
FIG. 7 shows a computer system of the preferred embodiment.

Referring now to FIG. 7, computer system 100 in accordance with the preferred embodiment comprises at least one CPU 10. Inasmuch as computer system 100 is preferably a server system, the computer system 100 preferably comprises multiple CPUs 10A, 10B, 10C, 10D arranged in a configuration where parallel computing may take place. The CPU array 10 couples to a main memory array 12 and a variety of other peripheral computer system components through an integrated host bridge logic device 14. The CPU array 10 may comprise, for example, a plurality of Pentium® III microprocessors. It should be understood, however, that computer system 100 could include other alternative types and numbers of microprocessors. Additionally, other architectures could be used if desired. Thus, the computer system may implement other bus configurations and bus bridges in addition to, or in place of, those shown in FIG. 7.

The main memory array 12 preferably couples to the host bridge logic 14 through a memory bus 16, and the host bridge logic 14 preferably includes a memory control unit (not shown) that controls transactions to the main memory 12 by asserting the necessary control signals during memory accesses. The main memory 12 functions as the working memory for the CPUs 10 and generally includes a conventional memory device or array of memory devices in which program instructions data are stored. The main memory array 12 may comprise any suitable type of memory such as Dynamic Random Access Memory ("DRAM") or any of the various types of DRAM devices such as Synchronous DRAM ("SDRAM"), Extended Data Output DRAM ("EDO DRAM"), or Rambus™ DRAM ("RDRAM").

Inasmuch as computer system 100 is preferably a server system, the computer system 100 may not have a dedicated display device. If the computer system did have a dedicated display device, such a system could be implemented by coupling a video driver card to the host bridge 14 by way of an Advanced Graphics Port bus or other suitable type of bus. Alternatively, the video driver card could couple to the primary expansion bus 18 or one of the secondary expansion buses, for example, the PCI bus 20. If the computer system had a dedicated display device, the video driver or graphic controller would couple to a display device. That display may comprise any suitable electronic display device upon which any image or text can be represented.

The computer system 100 preferably comprises another bridge logic device which may be an Input/Output Controller Hub ("ICH") 22 that bridges the primary expansion bus 18 to various secondary buses including a low pin count ("LPC") bus 24 and a peripheral component interconnect ("PCI") bus 20. Although the ICH 22 of FIG. 7 is shown only to support the LPC bus 24 and the PCI bus 20, various other secondary buses may be supported by the ICH 22.

In the preferred embodiment shown in FIG. 7, the primary expansion bus 18 comprises a Hub-link bus which is a proprietary bus of the Intel Corporation. However, computer system 100 is not limited to any particular type of primary expansion bus, and thus other suitable buses may be used.

Referring still to FIG. 7, a firmware hub 26 couples to the ICH 22 by way of the LPC bus 24. The firmware hub 26 preferably comprises Read Only Memory ("ROM") which contains software programs executable by the CPU array 10. The software programs preferably include programs to implement basic input/output system ("BIOS") commands, and instructions executed during and just after Power On Self Test ("POST") procedures.

A Super Input/Output controller 28 couples to the ICH 22 and controls many system functions including interfacing with various input and output devices such as keyboard 30. The Super I/O controller 28 may further interface, for example, with a system pointing device such as a mouse 32, various serial ports (not shown) and floppy drives (not shown). The Super I/O controller is often referred to as "super" because of the many I/O functions it may perform.

Also shown in the computer system 100 of FIG. 7 are three array controllers 50A, 50B, 50C coupled to the ICH 22 by way of the PCI bus 20. Each array controller 50 couples to a plurality of hard drives 52A, 52B, 52C. Thus, the array controller 50 preferably performs data reads, data writes and other necessary data manipulation to implement a RAID system including necessary calculations required to ensure drive failure recoverability and calculating missing data in the event of drive failures. It will be understood that while FIG. 7 shows only three array controllers 50, computer system 100 may support any number of these controllers.

Figure 8:
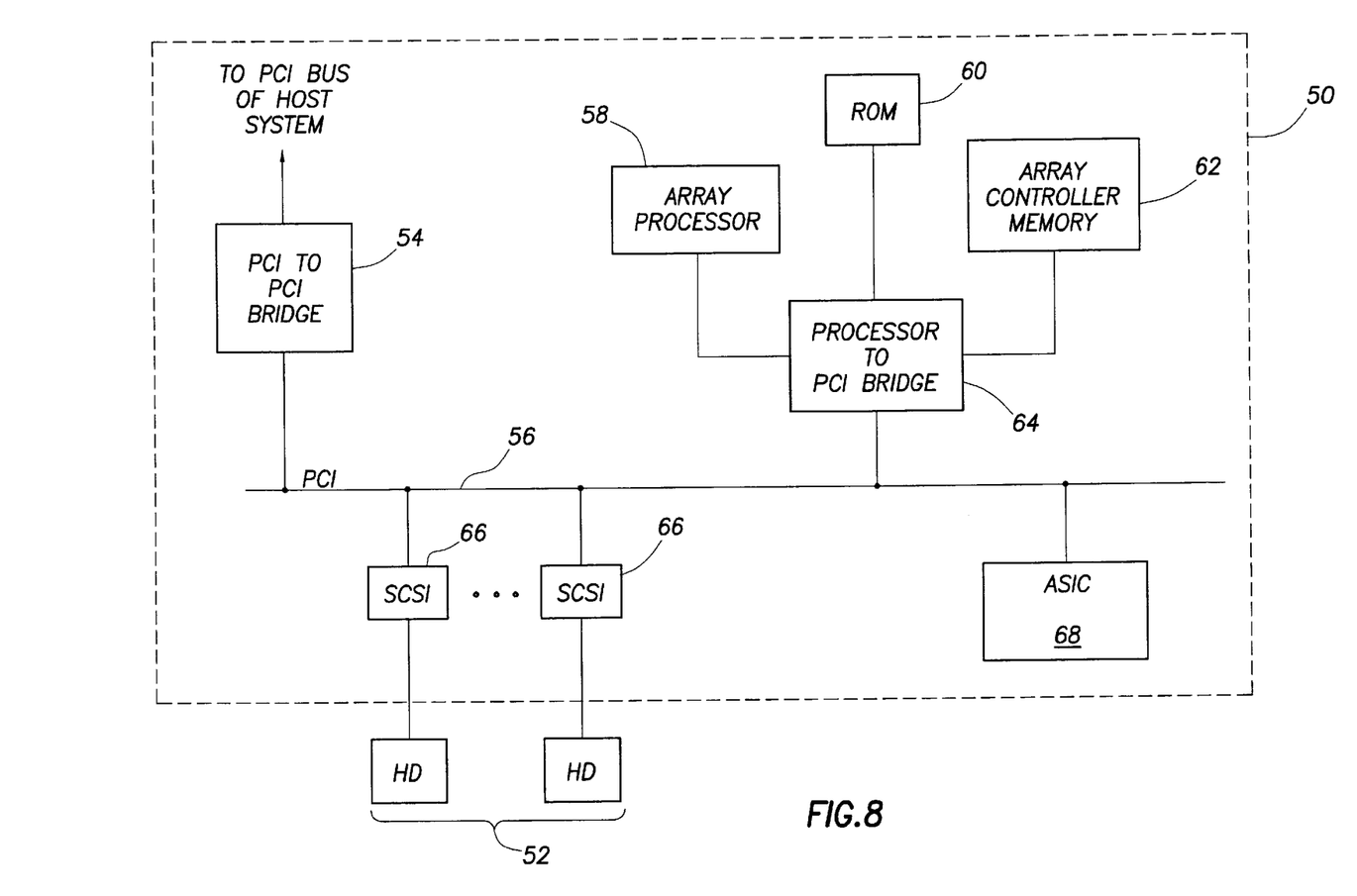
FIG. 8 shows an array controller of the preferred embodiment.

FIG. 8 shows the preferred structure of array controller 50 for use in the preferred embodiment of this invention. The array controller 50 preferably couples to the remaining computer system by way of the PCI bus 20 via a PCI to PCI bridge 54. The array controller 50 therefore has a local PCI bus 56, where the term "local" refers to the PCI bus residing within the array controller 50. The array controller also preferably has an array processor 58 coupled to a read only memory 60 and an array controller 62 by way of a processor to PCI bridge 64.

The array processor 58 preferably performs functions specific to the functionality of the array controller 50. That is, the array processor 58, executing programs stored on the ROM 60 in the memory work space 62 for the array controller, performs functions necessary to operate a RAID system. The array processor 58 may comprise a PowerPC® 740 processor manufactured by IBM. However, other microprocessors and even microcontrollers may be used as the array processor 58 and still be within the contemplation of this invention. The array processor 58 couples to a plurality of hard drives 52. Each hard drive of the plurality of hard drives 52 has a dedicated disk interface 66, which, could comprise a Small Computer System Interface ("SCSI") component. FIG. 8 only shows two hard drives 52 and two SCSI components 66; however, the array controller 50 can and preferably does have more hard drives 52, with each hard drive 52 having a dedicated SCSI component.

The calculations the array controller 50 makes to generate parity information and, when necessary; solving simultaneous equations to replace information lost because of failure of particular hard drives, is calculation intensive. To aid the array processor 58 in making these calculation s, array controller 50 further comprises an Application Specific Integrated Circuit ("ASIC") 68. The ASIC 68 of the preferred embodiment has the ability to perform multiple XOR operations simultaneously so that operational load on the array processor 58 is such that writes and reads to and from the array of disk drives completes with minimal delay.

The above discussion is meant to be illustrative of the principles and various embodiments of the present invention. Numerous variations and modifications will become apparent to those skilled in the art once the above disclosure is fully appreciated. For example, the preferred embodiment is disclosed to be based on an Intel platform; however, any chip-set capable of supporting a disk array system is within the contemplation of this invention. Only one coefficient matrix is described, but there may be others. Any system that incorporates parity values into the calculations to determine other parity values is within the contemplation of this invention. Moreover, the bridge device in the array controller could bridge to many different buses, including a Fiber Channel bus, IDE bus or Infiniban bus. Finally, the coefficient matrix of FIG. 5 has been described herein in terms of defining parity equations that are a function of other parity data; however, one of ordinary skill in the art, now understanding the disclosure, could apply and use the defined matrix to select linearly independent coefficients for parity equations that are not a function of other parity information. It is intended that the following claims be interpreted to embrace all such variations and modifications.

What is claimed is:

1. A computer system comprising:
   a processor;
   a main memory coupled to the processor via a host bridge device; and
   an array controller that accepts write data coupled to said main memory via a secondary expansion bus, wherein said array controller is adapted to generate a plurality of parity values, each parity value based on the write data and at least one of the remaining parity values.

2. The computer system as defined in claim 1 wherein said array controller further comprises:
   a first bridge device that couples to the secondary expansion bus;
   an array controller processor coupled to an array controller main memory;
   an interface circuit coupled to said first bridge device by way of an array controller bus, said interface circuit coupled one each to hard disk drives;
   an Application Specific Integrated Circuit (ASIC) coupled to the array controller bus, said ASIC adapted to at least partially calculate said parity values.

3. The computer system as defined in claim 2 wherein said ASIC is further adapted to calculate parity values based on the write data and each of the remaining parity values.

4. The computer system as defined in claim 3 wherein said array controller bus comprises a peripheral components interconnect bus.

5. The computer system as defined in claim 3 wherein said secondary expansion bus comprises a peripheral components interconnect bus.

6. The computer system as defined in claim 3 wherein said interface circuits further comprise small computer system interface (SCSI) circuits.

7. The computer system as defined in claim 1 wherein said array controller is further adapted to calculate parity values based on the write data and each of the remaining parity values.

8. The computer system as defined in claim 7 wherein said array controller is adapted to calculate said plurality of parity values according to the following matrix:

| | | | | | |
|---|---|---|---|---|---|
| 1 | 1 | 1 | ... | 1 | 1 |
| 1 | 2 | 3 | ... | N-1 | N |
| $1^2$ | $2^2$ | $3^2$ | ... | $(N-1)^2$ | $N^2$ |
| $1^3$ | $2^3$ | $3^3$ | ... | $(N-1)^3$ | $N^3$ |
| ... | ... | ... | ... | ... | ... |
| $1^{p-1}$ | $2^{p-1}$ | $3^{p-1}$ | ... | $(N-1)^{p-1}$ | $N^{p-1}$ | where N is the total number of drives of the computer system, and p is the number parity drives.

9. The computer system as defined in claim 7 wherein said array controller is adapted to calculate said plurality of parity values using a coefficient matrix comprising:
   a first equation having coefficients all being the value one;
   a second equation having coefficients starting with a value of one and each coefficient increasing in value by one with the largest coefficient being N, where N is the total number of drives in the computer system; and
   a third equation having coefficients starting with a value of one and each coefficient increasing in value by one with the largest coefficient being N, with each coefficient raised to the power p, where p is the number of parity drives.

10. A method of calculating error correction information for a redundant array of disks operated in a fault tolerant mode comprising:
    using a plurality of error correction equations such that each error correction value is based on both data stored in the system and at least one of the other error correction values.

11. The method as defined in claim 10 wherein using said plurality of error correction equations further comprises using the plurality of equations based on both data stored in the system and each of the other error correction values.

12. The method as defined in claim 11 further comprising:
using a first equation having coefficients all being the value one;
using a second equation having coefficients starting with a value of one and each coefficient increasing in value by one with the largest coefficient being N, where N is the total number of disks in the redundant array; and
using a third equation having coefficients starting with a value of one and each coefficient increasing in value by one with the largest coefficient being N, with each coefficient raised to the power p, where p is a number of parity drives.

13. An array controller that couples to a host computer system, comprising:
a first bridge device that couples the array controller to the host computer system;
an array controller processor coupled to an array controller main memory;
an interface circuit coupled to said first bridge device by way of an array controller bus, said interface circuit couples to a plurality of storage devices;
wherein said array controller is adapted to calculate a plurality of parity values, each parity value based on a plurality of data subsets and at least one of the other parity values.

14. The array controller as defined in claim 13 further adapted to calculate said plurality of parity values each based on the plurality of data subsets and each of the other parity values.

15. The array controller as defined in claim 14 further comprising an Application Specific Integrated Circuit (ASIC) coupled to the array controller bus; said ASIC adapted to at least partially calculate said plurality parity values.

16. The array controller as defined in claim 15 wherein said array controller bus comprises a peripheral components interconnect bus.

17. The array controller as defined in claim 15 wherein said disk interface circuits further comprise small computer system interface (SCSI) circuits.

18. The array controller as defined in claim 13 further adapted to calculate the plurality of parity values according to the following coefficient matrix:

| 1 | 1 | 1 | ... | 1 | 1 |
|---|---|---|---|---|---|
| 1 | 2 | 3 | ... | N-1 | N |
| $1^2$ | $2^2$ | $3^2$ | ... | $(N-1)2$ | $N2$ |
| $1^3$ | $2^3$ | $3^3$ | ... | $(N-1)3$ | $N3$ |
| ... | ... | ... | ... | ... | ... |
| $1^{p-1}$ | $2^{p-1}$ | $3^{p-1}$ | ... | $(N-1)^{p-1}$ | $N^{p-1}$ | where N is the total number of drives of the computer system, and p is the number parity drives.

19. A method of operating a disk array controller comprising:
fragmenting data into a plurality of data subsets;
calculating a plurality of error correction values, each error correction value based on said data subsets and at least one of the other of the plurality of error correction values; and
striping by said disk array controller said plurality of data subsets and error correction values to disks in an array of disks.

20. The method as defined in claim 19 wherein said calculating error correction values further comprises calculating said error correction values based on the data subsets and each of the other of the plurality of error correction values.

21. The method as defined in claim 20 wherein said calculating error correction values further comprises using a pre-defined matrix of coefficients defining error correction equations.

22. The method as defined in claim 21 wherein said using a pre-defined matrix further comprises using a coefficient matrix equal to:

| 1 | 1 | 1 | ... | 1 | 1 |
|---|---|---|---|---|---|
| 1 | 2 | 3 | ... | N-1 | N |
| $1^2$ | $2^2$ | $3^2$ | ... | $(N-1)2$ | $N2$ |
| $1^3$ | $2^3$ | $3^3$ | ... | $(N-1)3$ | $N3$ |
| ... | ... | ... | ... | ... | ... |
| $1^{p-1}$ | $2^{p-1}$ | $3^{p-1}$ | ... | $(N-1)^{p-1}$ | $N^{p-1}$ | where N is the total number of disk drives in the redundant array of disks, and p is the number of parity drives.

23. A method of calculating parity values for storage device failure recovery in a system having a plurality of storage devices comprising:
selecting parity equation coefficients according to the following coefficient:

| 1 | 1 | 1 | ... | 1 | 1 |
|---|---|---|---|---|---|
| 1 | 2 | 3 | ... | N-1 | N |
| $1^2$ | $2^2$ | $3^2$ | ... | $(N-1)2$ | $N2$ |
| $1^3$ | $2^3$ | $3^3$ | ... | $(N-1)3$ | $N3$ |
| ... | ... | ... | ... | ... | ... |
| $1^{p-1}$ | $2^{p-1}$ | $3^{p-1}$ | ... | $(N-1)^{p-1}$ | $N^{p-1}$ | where N is the number of storage devices and p is the number of parity devices, and wherein said selecting for each parity equation begins at the same column and extends across a row, and said selecting further increases by one row for each parity equation.

* * * * *